March 2, 1965    D. E. ABRAHAMSON ETAL    3,172,055
NUCLEAR MAGNETIC RESONANCE SPIN OSCILLATOR
Filed June 21, 1961

INVENTORS
DEAN E. ABRAHAMSON
PAUL D. SENSTAD
BY Roger W. Jensen
ATTORNEY

United States Patent Office 3,172,055
Patented Mar. 2, 1965

1

3,172,055
NUCLEAR MAGNETIC RESONANCE SPIN
OSCILLATOR
Dean E. Abrahamson and Paul D. Senstad, Minneapolis, Minn., assignors to Honeywell Inc., a corporation of Delaware
Filed June 21, 1961, Ser. No. 118,704
3 Claims. (Cl. 331—94)

This invention pertains to magnetic resonance spin generators and more particularly to improved means for aligning the orthogonal coils in a magnetic resonance spin generator.

Elementary particles, which include such particles as electrons and protons, in addition to the properties of mass, charge, and intrinsic angular momentum, have a property known as magnetic moment. The magnetic moment is due to the spin and the charge on the particle. These particles behave somewhat like a spinning bar magnet. For simplicity only nuclei which are composed of elementary particles will be discussed, but it should be remembered that electrons as well as other particles will act in a similar manner. In a steady magnetic field the nuclei attempt to align with the field but due to the spinning they act in a gyroscopic manner and precess. That is, the nuclei, or imaginary bar magnets, appear to be universally attached at one end, with the other end nutating in a manner to cause the bare magnet to appear to trace a conical path. The amount of precession of the nuclei or bar magnets from spin axis is directly proportional to the magnitude of the magnetic field applied to the material. The frequency of precession is directly proportional to the type of material used and the magnitude of the magnetic field applied.

The aligned nuclei produce a magnetic field which is perpendicular to the applied steady magnetic field and pulsating at the precesison frequency. By using the given material as the core of a cylindrically wound coil and applying the steady magnetic field along an axis perpendicular to the axis of the coil a voltage will be induced in the coil that has an amplitude proportional to the amount of precession of the nuclei and which has a frequency proportional to the type of material used and the magnitude of the steady magnetic field applied.

When the nuclei of a given material are placed in a steady magnetic field and caused to precess about their spin axis at a given frequency this precession may be increased by applying a second magnetic field to the material at right angles to the steady magnetic field. However, this second magnetic field must be alternating at the precession frequency. By alternating at the precession frequency this second magnetic field, in effect, gives each of the nuclei a push at the proper moment, thereby precessing them further in a gyroscopic manner. By placing a cylindrical coil around the material upon which two orthogonal magnetic fields are applied with the axis of the coil mutually perpendicular to both magnetic fields and the first magnetic field is unidirectional while the second magnetic field is alternating at the exact frequency at which the nuclei of the material are precessing, the condition known as magnetic resonance is obtained and at this frequency a maximum of energy will be induced into the coil.

In prior art devices a material, the sample, having nuclei with non-zero magnetic moments is surrounded by a first cylindrical coil and this entire assembly is surrounded by a second cylindrical coil having an axis orthogonal to the axis of the first coil. A unidirectional magnetic field is then applied which is mutually perpendicular to both coil axes. The unidirectional magnetic field applied causes the initial precession and alignment of the nuclei.

2

The second coil is then energized at the frequency of precession of the sample material and a voltage having the precession frequency is induced in the first coil wound about the sample by the precession of the nuclei. This prior art device is very difficut to use since a voltage is induced in the first coil directly from the second coil unless they are exactly orthogonal.

In general, the voltage induced in the first coil is applied to an amplifier and then fed directly back to the second coil. Since the voltage induced in the first coil has a frequency equal to the resonant frequency of the sample material, the voltage applied to the second coil automatically has the correct frequency to produce resonance. However, if there is direct coupling between the first and second coils it can be seen that oscillations will occur which will not necessarily rely upon the precession frequency of the material. It can be shown that the amplitude of the voltage produced by the first coil due to direct induction between the coils must be a very small part of the amplitude of the voltage applied to the second coil or oscillations will occur which are simply dependent upon the frequency of the device and not the frequency of precession of the sample. This unwanted coupling must be very small because the voltage induced in the first coil by the precession of the nuclei of the sample material within the first coil is quite small and the voltage induced in the first coil due to direct induction between the coils must be much smaller than this voltage. Because the mutual inductance must be so small it is almost impossible to align the two coils orthogonally and, in fact, the prior art devices can only be made to operate by means of external filters and resonant circuits. Because of this filtering the prior art devices can only operate at one frequency and this combined with the extreme alignment difficulties greatly limits their usefulness.

In the present invention a first winding means is wound about a first axis. This first winding means consists of a single large cylindrical coil. A second winding means consists of two smaller identical cylindrical coils mounted adjacent and parallel to an axis perpendicular to the first axis. The second winding means is mounted within the first winding means and as close to the center as can be practically realized. The second winding means is then connected to two inputs of a push-pull amplifier, the output of which is connected to the first winding means. The two coils in the second winding means are constructed so that they are as close to identical as practical and they are connected to the inputs of the push-pull amplifier so that any voltage induced by the first winding means in one of the coils and applied to one input of the amplifier is also induced by the first winding means in the other coil in the same phase and applied to the other input of the amplifier. The push-pull amplifier is constructed so that it can be trimmed to cancel out approximately equal voltages applied to its two inputs. Thus, any voltage induced in the two coils of the second winding means by the first winding means is cancelled out in the push-pull amplifier.

A sample comprised of some material having atoms with nuclei which have non-zero magnetic moments, for example a diamagnetic material, is placed in one of the coils of the second winding means and a first seady magnetic field is applied to cause the nuclei of the sample material to align and precess. This precession of the nuclei induces a voltage in the coil of the second winding means within which the sample is positioned and this voltage is applied to one of the inputs of the push-pull amplifier. Since an equal voltage is not applied to the other input of the push-pull amplifier, the voltage induced by the sample is amplified and applied, by means of the output of the amplifier, to the first winding means. The first winding means then produces an alternating magnetic field which has a frequency equal to the precession of the nuclei of the sample material. This alternating magnetic field causes the nuclei to precess farther and nuclear magnetic resonance is attained.

Thus, it can be seen that this invention greatly simplifies the alignment and construction of this device and because no external filters are necessary to reduce the effective mutual coupling, a broad band over which this invention will operate is obtained. Because of this broad band of frequencies over which the present invention will operate, varying magnetic fields may be measured and a variety of sample materials may be utilized.

It is a primary object of this invention to provide an improved control apparatus.

It is a further object of this invention to provide an improved magnetic resonance spin generator.

It is a further object of this invention to provide a magnetic resonance spin generator with a broad band frequency response.

Still a further object of this invention is to provide a magnetic resonance spin generator which is easy and inexpensive to construct and simple to align.

These and other objects of this invention will become apparent from the following description of a preferred form thereof and the accompanying specification, claims and drawings, of which:

Figure 1:
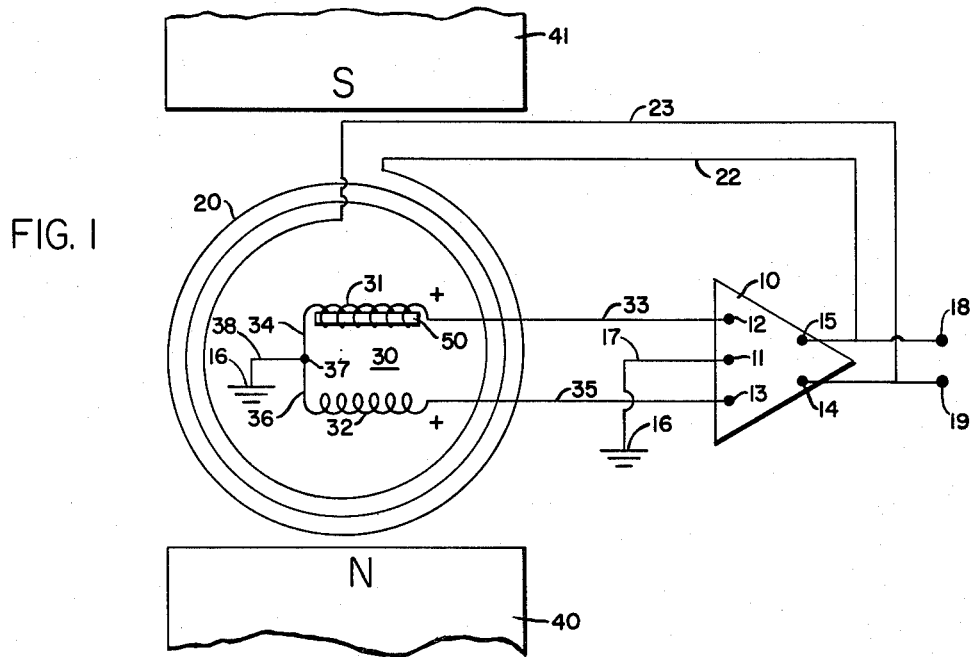
FIGURE 1 is a somewhat schematic presentation of the preferred embodiment of the present apparatus.

A preferred embodiment of the present apparatus is shown in FIGURE 1. Numeral 10 designates a push-pull amplifier the operation of which is well known to those skilled in the art. The amplifier 10 has a first input between terminal 11 and terminal 12. Terminal 11 is connected to ground 16 with a lead 17. Since terminal 11 is simply ground 16, or a reference point, this first input will hereafter be designated numeral 12. Amplifier 10 has a second input between terminals 11 and 13 which will hereafter be designated numeral 13 since numeral 11 simply designates a reference terminal. Output means for amplifier 10 is depicted by a terminal 14 and a terminal 15. In this preferred embodiment amplifier 10 is a high gain amplifier and is so constructed that equal or nearly equal signals on the first input 12 and the second input 13 will cancel each other out and no output signal will appear on terminals 14 and 15. A push-pull amplifier is preferred because it can be constructed to cancel, or trim, out nearly equal voltages applied to the inputs, thereby facilitating the construction and alignment of the remainder of the circuitry.

Figure 2:
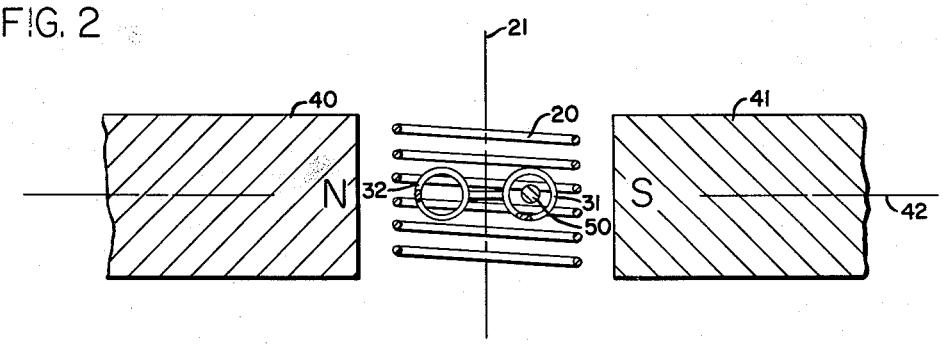
FIGURE 2 is a partial view of a configuration of the present apparatus similar to FIGURE 1 showing the relationship of the coils and the magnetic fields.

A first winding means 20 is comprised of a single cylindrical coil with a comparatively large diameter. This coil is mounted, by means not shown, along a first axis designated 21. This axis can be more clearly seen in FIGURES 2 and 3. First winding means 20 is connected to output terminals 15 and 14 of amplifier 10 by means of a pair of leads 22 and 23. Thus, winding means 20 is energized by any output from amplifier 10 and is in effect an alternating magnetic field producing means. Output means for the complete device are depicted by a pair of terminals 18 and 19. Terminal 18 is connected to terminal 15 of amplifier 10 and terminal 19 is connected to terminal 14 of amplifier 10. It should be noted that the output can be at other points and this is simply one convenient configuration.

In this preferred embodiment the first winding means 20 is a cylindrical coil having a comparatively large aperture therein. Winding means 20 simply operates to set up an alternating magnetic field within the aperture. This alternating magnetic field should be of a desired frequency, as will be explained later, and the lines of flux should be directed along axis 21. It is possible that other methods of producing this alternating magnetic field or other configurations of winding means 20 could be utilized. Therefore, the scope of this invention is not intended to be limited by this preferred configuration.

Figure 3:
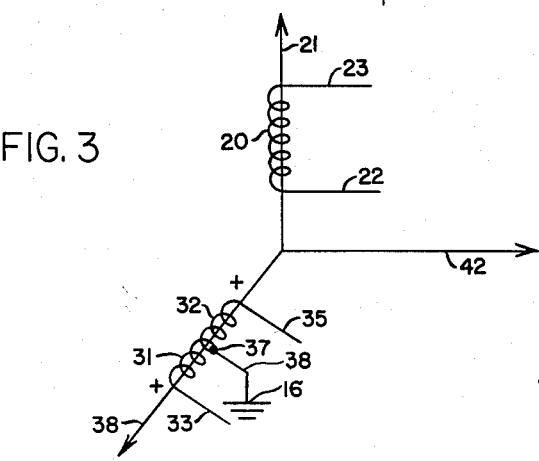
FIGURE 3 is a geometrical drawing depicting the orthogonal relationship of the coils and the magnetic field.

A second winding means or sensing means 30 is comprised of a first cylindrical coil 31 and a second cylindrical coil 32. Coil 31 and coil 32 are constructed as nearly identical as practical. One end of coil 31 is connected to the first input 12 of amplifier 10 by means of a lead 33. The other end of coil 31 is connected to reference terminal 37 by means of a lead 34. Terminal 37 is connected to ground 16 through a lead 38. One end of coil 32 is connected to the second input 13 of amplifier 10 by means of a lead 35. The other end of coil 32 is connected to reference terminal 37 by means of a lead 36. Coils 31 and 32 are mounted, by means not shown, within the aperture of the winding means 20 so that any voltage induced into one of the coils by the alternating magnetic field produced by winding means 20 is equally induced into the other coil. Thus, equal or approximately equal voltages appear on terminals 12 and 13 of amplifier 10. This is accomplished by mounting coils 31 and 32 substantially adjacent and parallel to an axis 38. This axis 38 is approximately perpendicular to axis 21, as shown in FIGURE 3.

By mounting winding means 30 along an axis 38 substantially perpendicular to the axis 21 along which winding means 20 is mounted very little if any mutual coupling is obtained between winding means 20 and winding means 30. When a voltage is induced in coil 31 by winding means 20 an equal voltage is induced in coil 32 by winding means 20 and both voltages are applied to the first and second inputs 12 and 13 of amplifier 10 where they are cancelled out because the amplifier only amplifies their difference voltage. Thus, effectively no mutual coupling occurs between first winding means 20 and second winding means 30.

It should be noted the coils 31 and 32 could be connected so that voltages opposite in polarity and equal in magnitude are induced in them and they could be connected so that these voltages counteract each other in the winding means 30 itself. Then the algebraic sum of the two voltages, which would be zero when neither coil has a sample therein, could be applied to a one input, high gain amplifier. One skilled in the art could devise many configurations of this circuitry and this invention is not intended to be limited by this one preferred embodiment.

A means of producing a unilateral magnetic field consists of a north pole 40 and a south pole 41 in this preferred embodiment. These poles 40 and 41 are mounted, by means not shown, so that a unidirectional field is set up along an axis 42 mutually perpendicular to axes 21 and 38. This relationship is shown in FIGURE 3. Poles 40 and 41 are further mounted so that winding means 30 is approximately centrally located therebetween. This is to insure as uniform a magnetic field as possible under the given conditions. It should be understood that it is not intended to limit this invention to a permanent magnet and that any means for producing a unidirectional magnetic field would be within the scope of this invention.

A sample 50 is placed within one of the coils 31 or 32 of winding means 30. In this preferred embodiment sample 50 is placed within coil 31 but could equally well be placed within coil 32. Sample 50 is comprised of a diamagnetic material or some material with atoms having nuclei with non-zero magnetic moments. The nuclei of the atoms in sample 50 may be thought of as spinning bar magnets. When a magnetic field is applied to sample 50 by some means such as magnetic poles 40 and 41 the nuclei of the atoms in sample 50 tend to react as bar magnets and eventually align with the magnetic field. However, because of the spin or magnetic moment of the nuclei a gyroscopic action occurs and the nuclei precess about their precession axes. When enough nuclei become aligned a voltage will be induced in coil 31. The magnitude of this induced voltage will depend upon the amount of precession and the number of nuclei aligned. This induced voltage will be an alternating voltage and the frequency will be dependent upon the magnitude of the magnetic field and the type of material used in sample 50. Since a voltage is induced in coil 31 by sample 50 but none is induced in coil 32, a net voltage is applied to input means 12 of amplifier 10 which is larger than the voltage applied to input means 13. The difference voltage is amplified and appears at output means 14 and 15. The amplified voltage is then applied to winding means 20 by means of leads 22 and 23.

The voltage from amplifier 10 alternating at the precession frequency energizes winding means 20. Since winding means 20 is energized at the precession frequency of the nuclei in the atoms of sample 50, it produces an alternating magnetic field, and this field is perpendicular to the unidirectional magnetic field produced by magnetic poles 40 and 41. This alternating magnetic field is alternating at the precession frequency of the nuclei in the atoms of sample 50 and adds to the precession of the nuclei vectorially causing them to precess farther. The alternating magnetic field may be thought of as giving the nuclei a push at just the proper moment to cause them to precess farther. As the nuclei precess farther a larger voltage is induced in coil 31 which is amplified by amplifier 10 and applied to winding means 20 causing the alternating magnetic field to become stronger. This increase of induced energy continues until the nuclei reach a maximum point or until the time at which the losses in the circuit just equal the energy applied. The maximum induced energy point is reached when the nuclei have precessed so far that instead of appearing as bar magnets nutating in a conical path they appear as bar magnets revolving in a flat disc. That is, the precession angle has become 90°.

Thus, the frequency at which this magnetic resonance generator operates is directly proportional to the magnitude of the magnetic field produced by magnetic poles 40 and 41, and the type of material used in sample 50. All mutual coupling between winding means 20 and winding means 30 is effectively cancelled out by this invention and the only induction between the two winding means 30 and 20 is through the nuclei of the atoms of sample 50. It can be seen that the only critical points in this invention are the initial construction and mounting of coils 31 and 32 within winding means 20. Once coils 31 and 32 are constructed approximately identical and mounted approximately parallel to axis 38, there are no further critical mechanical alignment procedures. The difference voltage representing imperfect alignment of coils 31, 32 and 20 is cancelled out by minor trimming of the gains of the two sides of push-pull amplifier 10. Thus, the alignment of this device has been greatly simplified. Also, since no external tuning or filter circuits are necessary, the band width of this device is limited only by the band width of amplifier 10. Thus, an inexpensive and simple device to construct as well as an extremely beneficial device to use has been provided.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. A magnetic resonance spin generator comprising: first winding means; means mounting said first winding means along a first axis; second winding means, said second winding means comprising two substantially identical coils; means mounting said coils of said second winding means approximately parallel and adjacent to a second axis and within said first winding means, said second axis being approximately perpendicular to said first axis; a sample composed of diamagnetic material, said diamagnetic material being characterized by atoms with elementary particles having non-zero magnetic moments capable of undergoing precession at the Larmor frequency about one axis in a first direction, said sample being positioned within one of said coils of said second winding means; means for producing a unidirectional magnetic field mutually perpendicular to said first and second axes, said magnetic field causing said magnetic moments of said particles to orient in a first direction; means energizing said first winding means producing an alternating magnetic field, substantially at said Larmor frequency to effect said precession for inducing a precession voltage in said one of said coils, and said two coils of said second winding means being disposed to have susbtantially equal voltages induced therein by said alternating magnetic field; and means connected to said coils and responsive to the difference of the voltages induced in said coils for providing a compensated signal voltage at said Larmor frequency, said last named means comprising said means energizing said first winding means, whereby an oscillation signal at the Larmor precession frequency of said particles is sustained.

2. Apparatus of the class described comprising: first winding means; means mounting said first winding means along a first axis; second winding means, said second winding means comprising two substantially identical coils; means mounting said coils of said second winding means approximately parallel and adjacent to a second axis and within said first winding means, said second axis being approximately perpendicular to said first axis; amplifying means having an input and an output, said amplifying means being characterized by effectively cancelling equal voltages applied to said input; and means for connecting said first winding means to said output of said amplifying means and said second winding means to said input of said amplifying means, said output of said amplifying means energizing said first winding means and producing an alternating magnetic field, said alternating magnetic field inducing approximately equal voltages in said two coils of said second winding means.

3. Apparatus of the class described comprising: first winding means; means mounting said first winding means along a first axis; second winding means, said second winding means comprising two substantially identical coils; means mounting said coils of said second winding means approximately parallel and adjacent to a second axis and within said first winding means, said second axis being approximately perpendicular to said first axis; a sample composed of material being characterized by elementary particles having non-zero magnetic moments and said particles displaying gyroscopic properties, said sample being positioned within one of said coils of said second winding means; means for producing a unilateral magnetic field mutually perpendicular to said first and second axes, said magnetic field causing said magnetic moments of said particles to orient in a first direction; amplifying means having an input and an output, said amplifying means being characterized by effectively cancelling equal voltages applied to said input; and means for connecting said first winding means to said output of said amplifying means and said second winding means to said input of said amplifying means, said output of said amplifying means energizing said first winding means thereby producing an alternating magnetic field, said alternating magnetic field causing said particles to precess in a gyroscopic manner in said first direction and induce a voltage in said one of said coils, and said alternating magnetic field inducing substantially equal voltages in said two coils of said second winding means.

References Cited by the Examiner

UNITED STATES PATENTS

| | | | |
|---|---|---|---|
| 2,589,494 | 3/52 | Hershberger | 324—0.5 |
| 2,955,252 | 10/60 | Williams | 324—0.5 |
| 3,039,047 | 6/62 | Williams | 324—0.5 |

FOREIGN PATENTS 867,843    5/61    Great Britain.

CHESTER L. JUSTUS, *Primary Examiner.*

MAYNARD R. WILBUR, MILTON O. HIRSHFIELD, *Examiners.*